(12) United States Patent
Cha

(10) Patent No.: US 12,357,938 B2
(45) Date of Patent: Jul. 15, 2025

(54) FILTER EQUIPMENT HAVING SIMPLE AND STABLE INSTALLATION STRUCTURE

(71) Applicant: ECOROCELL Co., Ltd., Hwaseong-si (KR)

(72) Inventor: Min Su Cha, Hwaseong-si (KR)

(73) Assignee: ECOROCELL Co., Ltd., Hwaseong-si (KR)

( * ) Notice: Subject to any disclaimer, the term of this patent is extended or adjusted under 35 U.S.C. 154(b) by 402 days.

(21) Appl. No.: 18/083,595

(22) Filed: Dec. 19, 2022

(65) Prior Publication Data

US 2023/0285889 A1 Sep. 14, 2023

(30) Foreign Application Priority Data

Mar. 14, 2022 (KR) .................. 10-2022-0031644

(51) Int. Cl.
| | | |
|---|---|---|
| B01D 46/88 | (2022.01) | |
| B01D 46/00 | (2022.01) | |
| B01D 46/24 | (2006.01) | |
| B01D 46/42 | (2006.01) | |

(52) U.S. Cl.
CPC ......... B01D 46/88 (2022.01); B01D 46/0004 (2013.01); B01D 46/001 (2013.01); B01D 46/0095 (2013.01); B01D 46/2403 (2013.01); B01D 46/4227 (2013.01);
(Continued)

(58) Field of Classification Search
None
See application file for complete search history.

(56) References Cited

U.S. PATENT DOCUMENTS

| | | | |
|---|---|---|---|
| 2014/0230385 A1* | 8/2014 | Schuld | B01D 46/10 |
| | | | 55/481 |
| 2015/0052865 A1* | 2/2015 | Jackson | B01D 46/543 |
| | | | 55/487 |
| 2018/0236388 A1* | 8/2018 | Harris | B01D 29/23 |

FOREIGN PATENT DOCUMENTS

| | | |
|---|---|---|
| KR | 10-2010-0102173 A | 9/2010 |
| KR | 10-2017-0100287 A | 9/2017 |
| KR | 10-2144731 B1 | 8/2020 |

(Continued)

*Primary Examiner* — Brit E. Anbacht
(74) *Attorney, Agent, or Firm* — Revolution IP, PLLC

(57) ABSTRACT

A filter equipment includes a main body portion which has a hollow columnar structure with an open upper portion and a closed lower portion, and has a plurality of air inlets formed on a side surface to be spaced apart at regular intervals; a top cap which is detachably attached to an upper opening surface of the main body portion, and has a doughnut structure having a width corresponding to that of the filter portion in a plan view, a magnetic member attached to a lower surface of an air vent by a magnetically detachable structure being mounted on an upper surface of the top cap; a filter portion which has a hollow columnar structure corresponding to an inner peripheral surface of a main body portion, has a doughnut structure having a width corresponding to the lower surface of the top cap, has a structure that is in close contact with the lower surface of the top cap, purifies the air drawn in from the air inlet of the main body portion and then makes the purified airflow through a central opening portion of the top cap to the air vent; and a safety wire which is mounted inside the main body portion and extends by a predetermined length to be combined with one side of the top cap.

3 Claims, 12 Drawing Sheets

(52) U.S. Cl.
CPC .... *B01D 2265/023* (2013.01); *B01D 2265/06* (2013.01); *B01D 2271/02* (2013.01); *B01D 2279/35* (2013.01)

(56) References Cited

FOREIGN PATENT DOCUMENTS

| KR | 10-2020-0127496 A | 11/2020 |
| KR | 10-2257588 B1 | 5/2021 |
| KR | 10-2021-0117701 A | 9/2021 |

* cited by examiner

FILTER EQUIPMENT HAVING SIMPLE AND STABLE INSTALLATION STRUCTURE

CROSS-REFERENCE TO RELATED APPLICATION

This application claims priority under 35 U.S.C. § 119(a) to Korean Patent Application No. 10-2022-0031644, filed on Mar. 14, 2022, in the Korean Intellectual Property Office, the disclosure of which is incorporated herein by reference in its entirety.

BACKGROUND

(a) Technical Field

The present invention relates to a filter equipment mounted in an air vent, and more particularly, to a filter equipment including a simple and stable installation structure.

(b) Background Art

In general, all living spaces where people live, such as multihouse such as apartments and building such as officetels, have facilities that discharge turbid air inside and inject fresh air inside.

Such facilities include ducts installed in a structure in which the inside and the outside communicate, and purification devices that purify the air flowing through the ducts.

In the case of purifiers according to the related art, a structure equipped with a filter as well as a plurality of mechanical devices, are included as shown in FIG. 1.

In the case of purifiers including such structures according to the related art, there is a problem that a number of components of the mechanical devices need to be detached to replace the filter.

In addition, a filter replacement takes a relatively long time, and when a replacement time excessively elapses, a problem may occur in the mechanical device.

In this case, there may be a problem that the air inside the living space where the duct communicating with the problematic purifier is installed becomes continuously turbid, and if a fire breaks out or toxic gas is generated in the room, there is a problem in expansion of the accident.

Therefore, there is a need for a technology capable of solving the problems of the related art mentioned above.

PRIOR ART DOCUMENTS

Patent Document (Patent Document 1) Korean Patent Publication No. 10-2144731 (Registration date: Aug. 10, 2020)

SUMMARY OF THE INVENTION

An object of the present invention is to provide a filter equipment including a structure that can be easily and stably installed in air vents having various structures, can easily replace the filter, and can maximize the filtering effect.

A filter equipment according to an aspect of the present invention for achieving this object may be configured to include a main body portion which has a hollow columnar structure with an open upper portion and a closed lower portion, and has a plurality of air inlets formed on a side surface to be spaced apart at regular intervals; a top cap which is detachably attached to an upper opening surface of the main body portion, and has a doughnut structure having a width corresponding to that of the filter portion in a plan view, a magnetic member attached to a lower surface of an air vent by a magnetically detachable structure being mounted on an upper surface of the top cap; a filter portion which has a hollow columnar structure corresponding to an inner peripheral surface of a main body portion, has a doughnut structure having a width corresponding to the lower surface of the top cap, has a structure that is in close contact with the lower surface of the top cap, purifies the air drawn in from the air inlet of the main body portion and then makes the purified airflow through a central opening portion of the top cap to the air vent; and a safety wire which is mounted inside the main body portion and extends by a predetermined length to be combined with one side of the top cap.

In an embodiment of the present invention, the main body portion may be configured to include a bottom portion which has a circular structure in a plan view, extends upward along an outer peripheral surface by a predetermined height and is integrally connected to a side wall portion; the side wall portion which has a structure integrated with the outer peripheral surface of the bottom portion and extends by a predetermined height to form an internal space of the main body portion; and a plurality of fastening protrusions which are formed on an outer peripheral surface of an upper portion of the side wall to be spaced apart at a predetermined angle, and are combined with the fastening groove of the top cap to be attachable and detachable by a lateral rotation.

In this case, the top cap includes a ceiling portion of a plate-like doughnut structure which has the same outer diameter as the side wall portion of the main body portion in a plan view; a first downward extending portion which is integrated with an outer peripheral surface of the ceiling portion and extends downward by a predetermined length to cover a part of the upper portion of the side wall portion; a plurality of fastening grooves which are formed on an inner peripheral surface of the first downward extending portion to be spaced apart at a predetermined angle, and are combined with the fastening protrusion of the main body portion to be attachable and detachable by a lateral rotation; and a second downward extending portion which is continuously formed along an inner peripheral surface of a central through hole of the ceiling portion, and extends downward by a predetermined length to wrap a part of the upper portion of the filter portion.

Further, the top cap may be configured to further include a sealing contact portion which is mounted on the upper surface of the ceiling portion, has a structure that makes surface contact with the lower surface of the air vent, and is formed of a sealing material that comes into close contact with the lower surface of the air vent.

In an embodiment of the present invention, the magnetic member may be a plurality of permanent magnets that are spaced apart from each other by a predetermined angle on the basis of the center of the top cap in a plan view, and have a structure that is detachably bolted to the upper surface of the top cap.

In an embodiment of the present invention, the top cap may be configured to include sealing grooves which are concentrically formed on the basis of the center of the top cap in a plan view, are spaced apart by a predetermined width, and are formed by two or three to be recessed by a predetermined depth; a sealing member which is mounted on the sealing groove and seals the upper surface of the top cap and the lower surface of the air vent; a permanent magnet mounting portion which is mounted on the lower surface of the top cap, mounts a plurality of plate-like first permanent magnets to be spaced apart by a predetermined angle on the basis of the center of the top cap in a plan view, and fixes N and S poles of the first permanent magnets to be alternately arranged along the circular structure of the top cap in a plan view; a sliding thin plate portion which has a thin plate structure stacked on a lower surface of the permanent magnet mounting portion, and guides the permanent magnet mounting portion and the magnetic variable portion to be slidable relative to each other and to change the positions; a magnetic variable portion which is stacked and placed below the sliding thin plate portion, is mounted to be rotatable by a predetermined angle on the basis of to the center of the top cap in a plan view, mounts a large number of plate-like second permanent magnets to be spaced apart by a predetermined angle on the basis of the center of the top cap in a plan view, and fixes the N poles and S poles of the second permanent magnet to be alternately arranged along the circular structure of the top cap in a plan view; a handle portion which is formed to protrude laterally from an outer peripheral surface of the magnetic variable portion by a predetermined length, and is gripped by a user's finger to rotate the magnetic variable portion by a predetermined angle; and a rotation angle limiting structure which is mounted on one side of the top cap to define a home position rotation angle range of the magnetic variable portion.

In an embodiment of the present invention, the filter portion may be configured to include a filtering member which is formed with a large number of pores for adsorbing particulate foreign matter floating in the air, and is formed by being continuously bent into a doughnut shape on the basis of the center; a state holding member which is continuously mounted along an outer peripheral surface of the filtering member, and maintains the continuous bending structure of the filtering member; a filter upper end sealing portion which is mounted on the upper surface of the filtering member, has a predetermined thickness, has the same plate-like structure as the upper surface of the filtering member in a plan view, and is press-fitted to be in surface contact with the lower surface of the top cap to seal the upper surface of the filtering member and the lower surface of the top cap; and a filter lower end sealing portion which is mounted on the lower surface of the filtering member, has a predetermined thickness, has the same plate-like structure as the lower surface of the filtering member in a plan view, and is press-fitted to be in surface contact with the upper surface of the main body portion to seal the lower surface of the filtering member and the upper surface of the main body portion.

In an embodiment of the present invention, the air inlet may be formed by a large number to be spaced apart by a predetermined angle on the basis of the center of the main body portion in a plan view, and may be formed to have an air flow path formed in a direction parallel to an arbitrary straight line passing through the center of the main body portion in a plan view.

As described above, according to the filter equipment of the present invention, by including a main body portion, a top cap, a filter portion, and a safety wire having a specific structure, it is possible to provide a filter equipment that can be easily and stably installed in air vents having various structures, can easily perform a filter replacement, and can maximize the filtering effect.

In addition, according to the filter equipment of the present invention, the main body portion including the bottom portion, the side wall portion and the fastening protrusion of a particular structure is provided, and the top cap including the ceiling portion, the first downward extending portion, the fastening groove and the second downward extending of a particular structure is provided. Accordingly, it is possible to provide a filter equipment in which the doughnut-shaped filter portion can be stably mounted inside, and at the same time, the top cap and the main body portion can be easily separated and the filter portion mounted inside can be easily replaced with a new filter portion after being detached.

Further, according to the filter equipment of the present invention, the ceiling contact portion and the magnetic member having a specific structure are mounted on the upper surface of the ceiling portion of the top cap, and the filter upper end sealing portion and the filter lower end sealing portion are mounted on the upper and lower surfaces of the filter portion, respectively. Accordingly, it is possible to provide a filter equipment which can be easily attached and installed magnetically to the lower surface of the air vent, can be in sealing contact with the lower surface of the air vent at the same time to prevent air from leaking through a gap formed between the upper surface of the top cap and the lower surface of the air vent, thereby maximizing the filtering effect.

Further, according to the filter equipment of the present invention, by providing the sealing groove, the sealing member, the permanent magnet mounting portion, the sliding thin plate portion, the magnetic variable portion, the handle portion, and the rotation angle limiting structure of the specific structure, the filter equipment can be easily and stably attached to or detached from the lower surface of the air vent.

Further, according to the filter equipment of the present invention, since a large number of air inlets formed to have air flow paths formed in a specific direction are formed on the side surface of the main body portion, the flow direction of the air flowing in to the air inlets of the main body portion can be set in a specific direction depending on the intention of an installer. Accordingly, the main body portion can be installed in an optimized direction in consideration of the flow direction of the indoor air and flow depending on the installation environment and intention. As a result, it is possible to provide a filter equipment including a structure that can maximize the filtering effect.

DETAILED DESCRIPTION

Preferred embodiments of the present invention will now be described in detail with reference to the drawings. Prior to this, terms or words used in the specification and claims should not be construed as being limited to their customary or dictionary meanings, but should be construed as meanings and concepts consistent with the technical idea of the present invention.

Throughout this specification, when a certain member is located "on" another member, this includes not only a case where a certain member is in contact with another member, but also a case where there is another member between the two members. Throughout this specification, when a part "includes" a component, this does not exclude other components, but may also include other components, unless specifically stated to the contrary.

Figure 1:
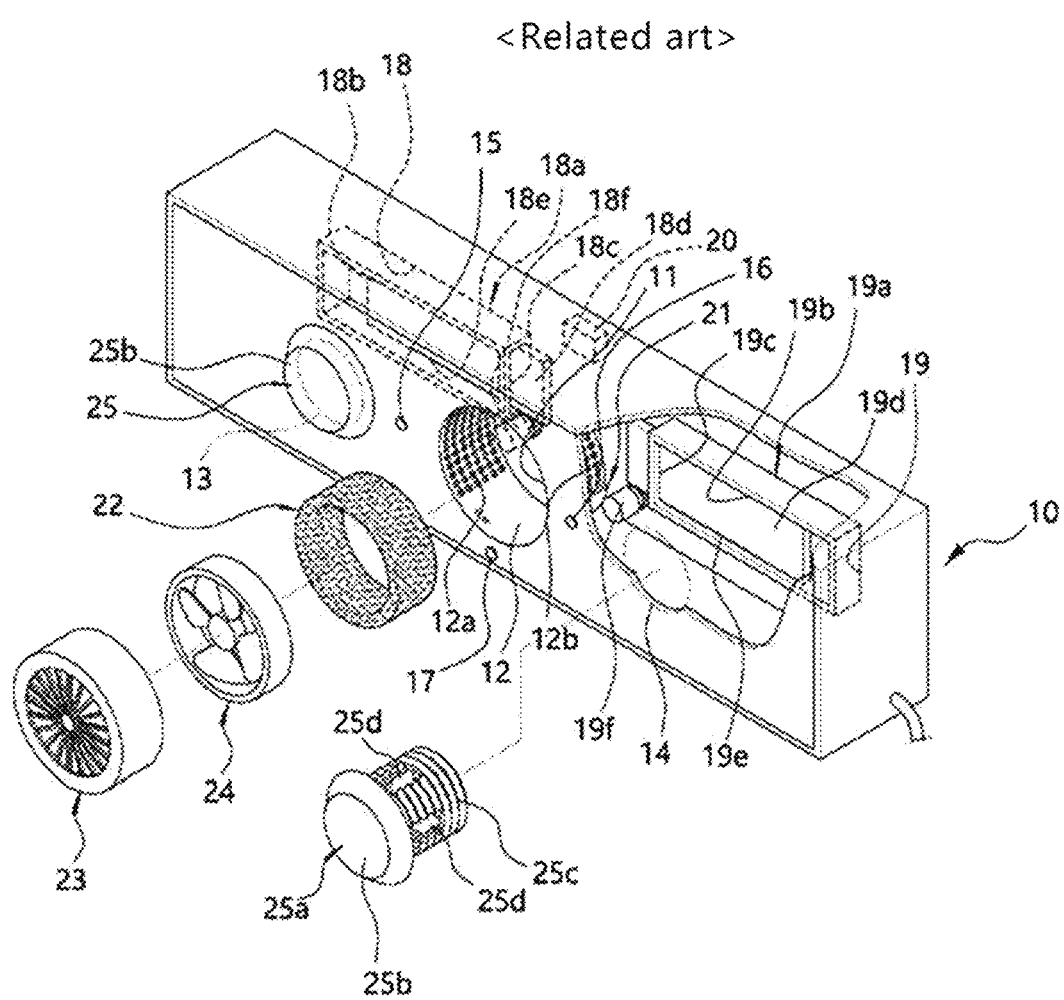
FIG. 1 is an exploded view showing a filter equipment mounted on an air vent according to the related art.
Figure 2:
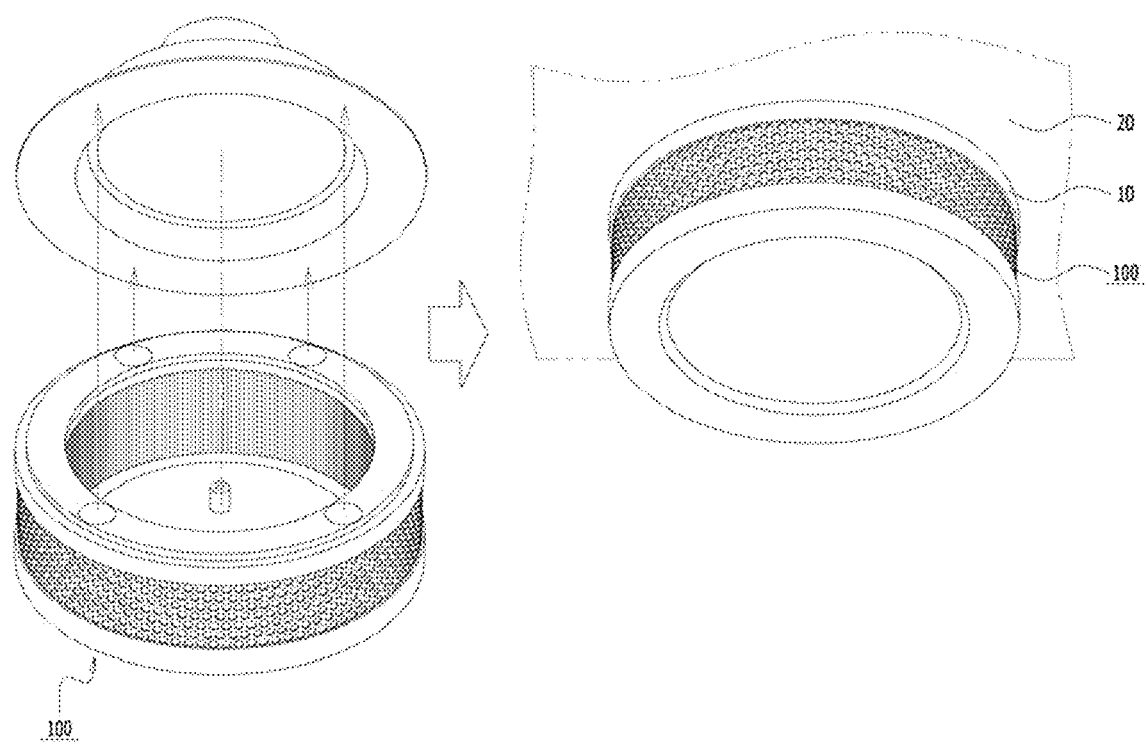
FIG. 2 is a photograph showing a state in which the filter equipment according to an embodiment of the present invention is mounted on the air vent.
Figure 3:
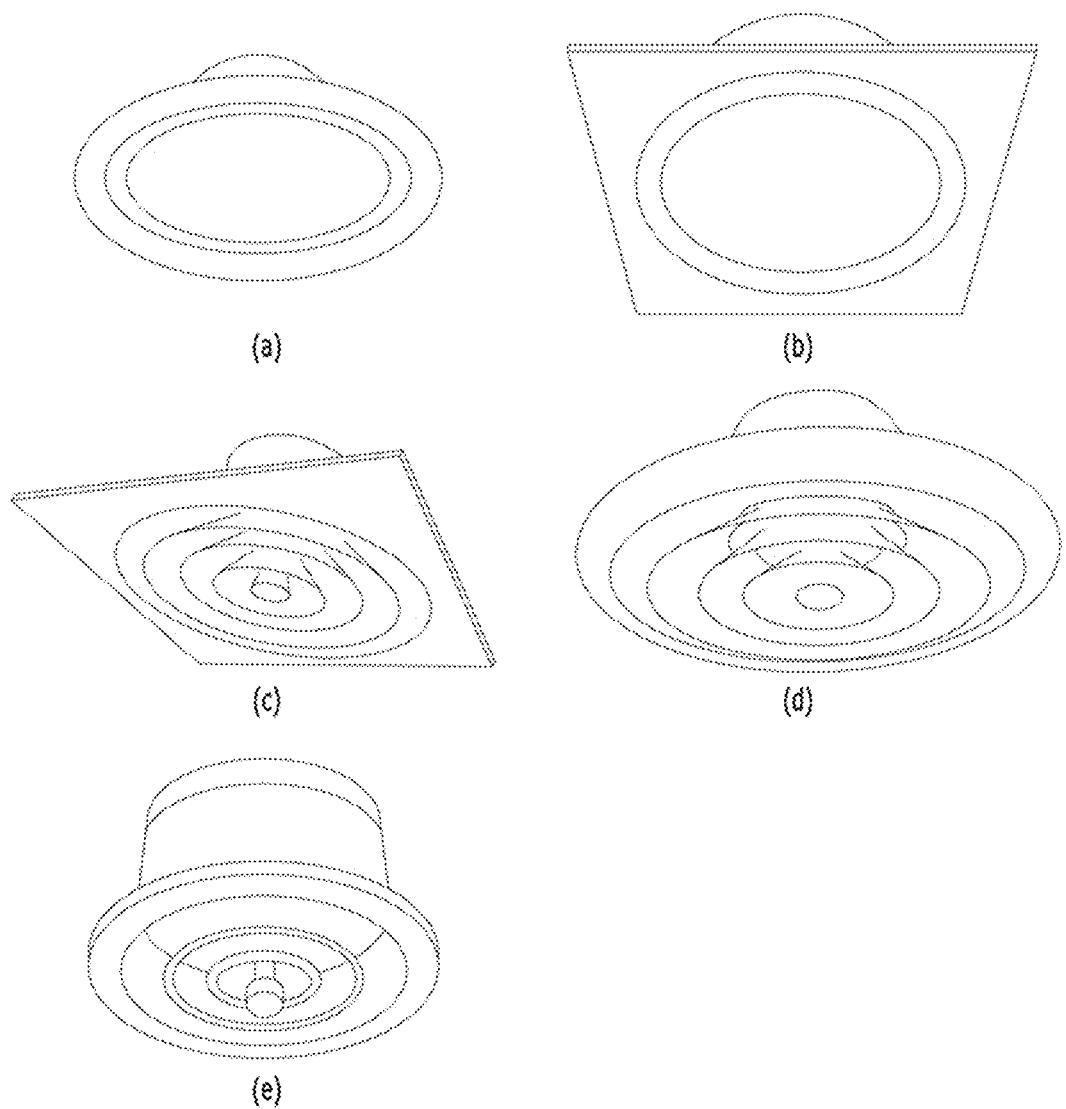
FIG. 3 is a photograph showing various types of air vents on which a filter equipment according to an embodiment of the present invention can be mounted.
Figure 4:
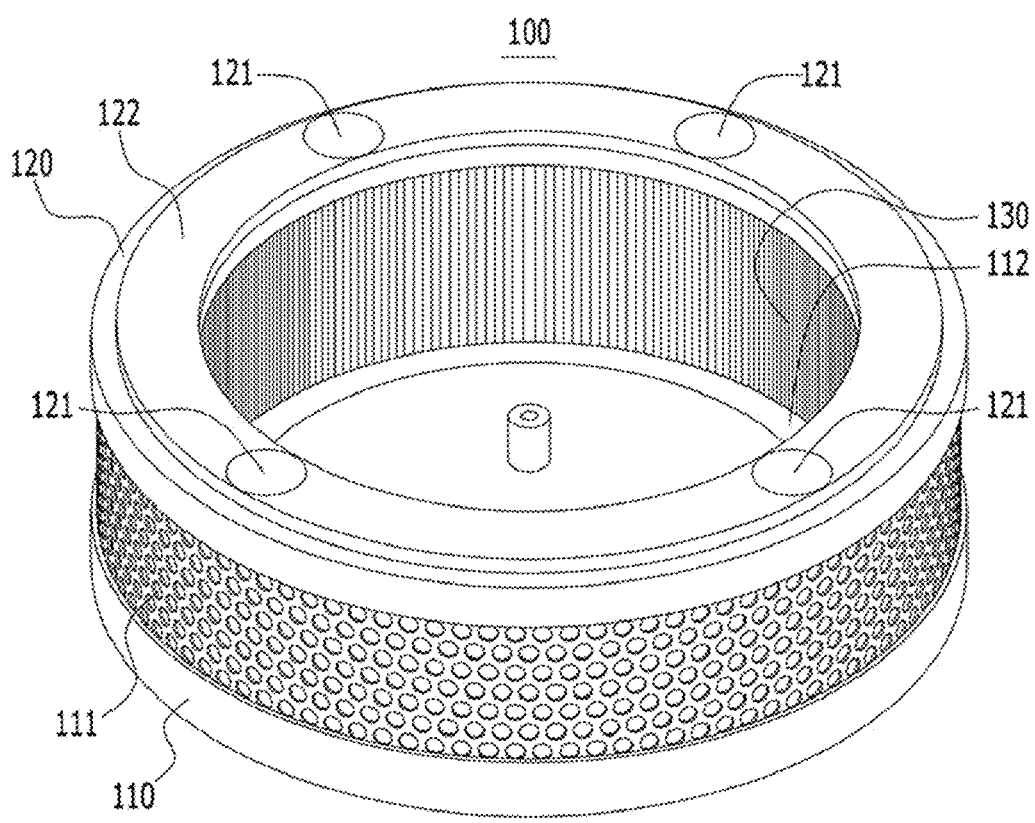
FIG. 4 is a photograph showing a filter equipment according to an embodiment of the invention.

FIG. 2 shows a photograph showing a state in which a filter equipment according to an embodiment of the present invention is attached to an air vent, FIG. 3 shows a photograph showing various types of air vents on which the filter equipment according to an embodiment of the invention can be mounted, and FIG. 4 shows a photograph showing a filter equipment according to an embodiment of the invention.

Referring to these drawings, since a filter equipment 100 according to the present embodiment includes a main body portion 110, a top cap 120, a filter portion 130, and a safety wire 140 having a specific structure, it is possible to provide a filter equipment that can be easily and stably installed in air vents having various structures, can easily perform a filter replacement, and can maximize the filtering effect.

Hereinafter, each configuration constituting the filter equipment 100 according to the present embodiment will be described in detail with reference to the drawings.

Figure 5:
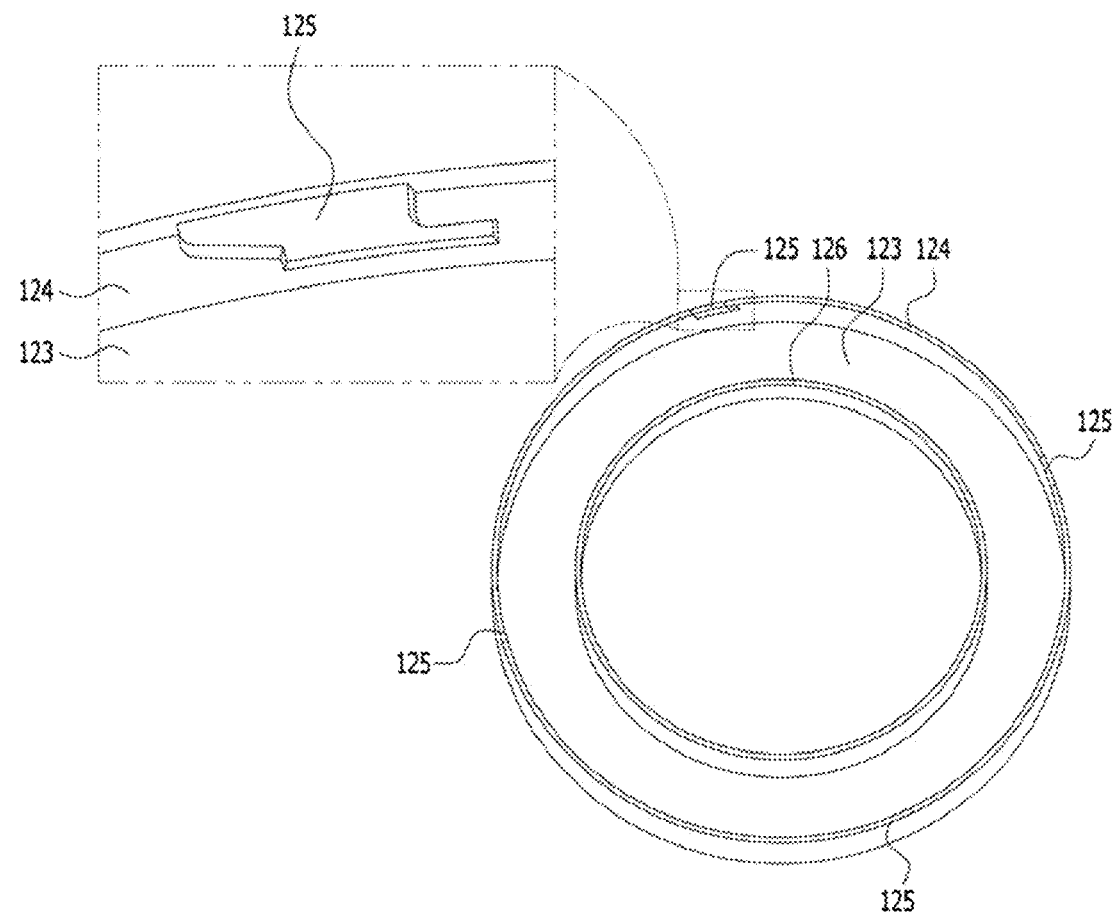
FIG. 5 is a photograph showing a top cap of the filter equipment shown in FIG. 4.
Figure 6:
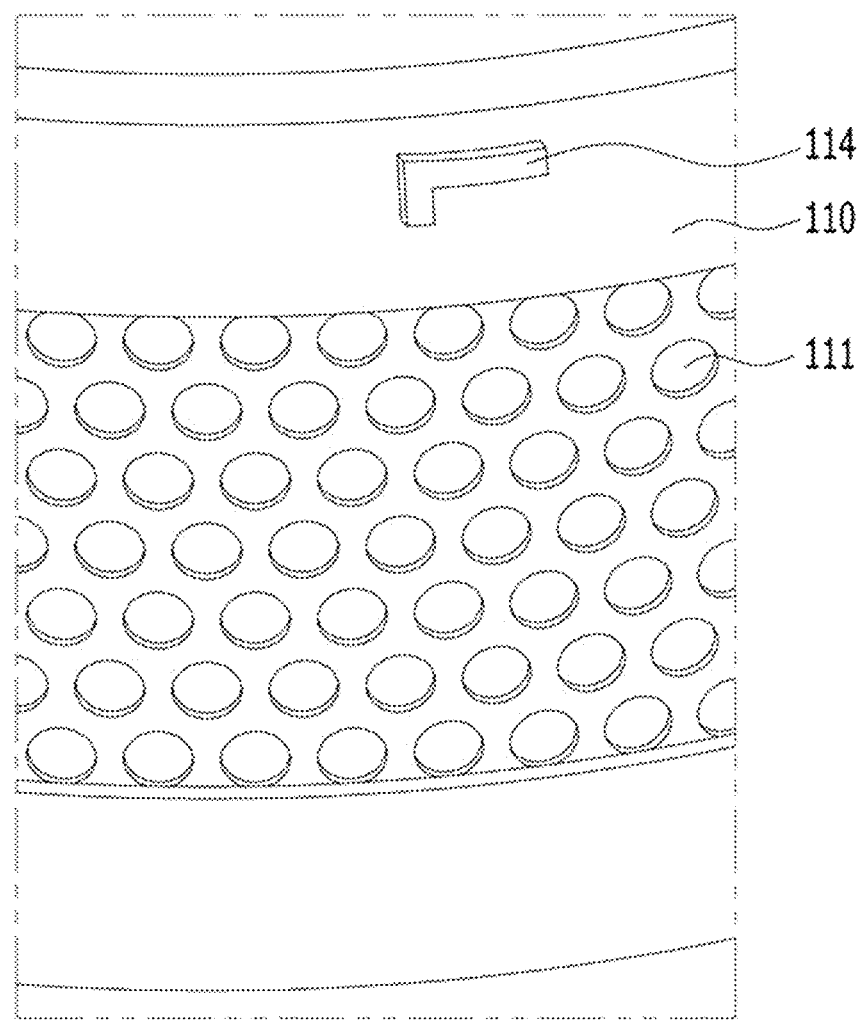
FIG. 6 is a partially enlarged photograph showing a part of a main body portion of the filter equipment shown in FIG. 4.
Figure 7:
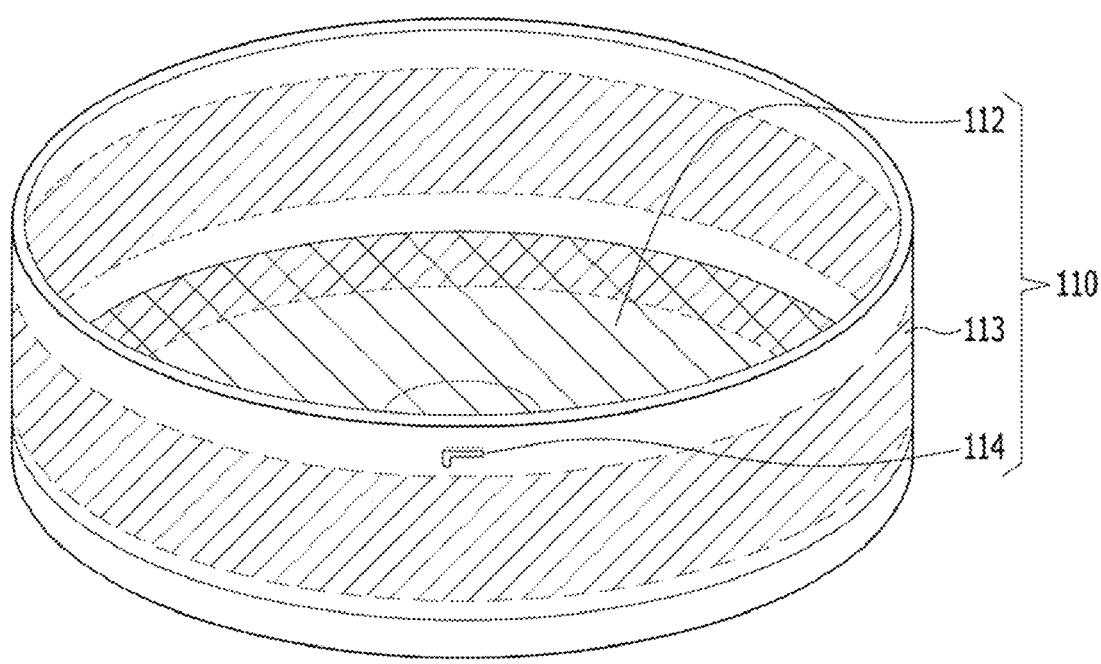
FIG. 7 is a perspective view showing the main body portion of the filter equipment according to an embodiment of the present invention.

FIG. 5 shows a photograph showing the top cap of the filter equipment shown in FIG. 4, and FIG. 6 shows a partially enlarged photograph showing an enlarged part of the main body portion of the filter equipment shown in FIG. 4, and FIG. 7 shows a perspective view of the main body portion of the filter equipment according to an embodiment of the present invention.

Referring to FIGS. 2 to 7, the main body portion 110 according to the present embodiment has a hollow columnar structure with an open top and a closed bottom, and has a structure in which a plurality of air inlets 111 are formed on the side thereof at regular intervals.

The top cap 120 according to the present embodiment is configured to be detachably attached to the upper opening surface of the main body portion 110, and has a doughnut structure having a width corresponding to that of the filter portion 130 in a plan view, and a magnetic member 121 attached to a lower surface of the air vent by a magnetically detachable structure can be mounted on an upper surface thereof.

The filter portion 130 according to the present embodiment has a hollow columnar structure corresponding to the inner peripheral surface of the main body portion 110, has a doughnut structure having a width corresponding to the lower surface of the top cap 120, and has a structure that is in close contact with the upper surface of the main body portion 110 and the lower surface of the top cap 120. At this time, the filter portion 130 can purify the air drawn in from the air inlet 111 of the main body portion 110 and then make the purified air flow through a central opening portion of the top cap 120 to the air vent.

Meanwhile, the safety wire 140 according to the present embodiment is configured to be mounted inside the main body portion 110, and has a structure that extends for a predetermined length and is combined with one side of the top cap 120. The extension length of the safety wire 140 is appropriately set to prevent a safety accident in advance in which the main body portion 110 falls to the ground in the process of separating the top cap 120 and the main body portion 110 of the filter equipment 100.

As shown in FIGS. 4 to 7, the main body portion 110 according to the present embodiment includes a bottom portion 112, a side wall portion 113 and a fastening protrusion 114 having a specific structure.

Specifically, the bottom portion 112 of the main body portion 110 has a circular structure in a plan view that extends upward along the outer peripheral surface by a predetermined height and is integrally connected to the side wall portion 113. The side wall portion 113 has a structure integrated with the outer peripheral surface of the bottom portion 112 and extends by a predetermined height to form an internal space of the main body portion 110. In addition, a plurality of fastening protrusions 114 are formed on the outer peripheral surface of the upper portion of the side wall 113 at a predetermined angle, and are combined with the fastening groove 125 of the top cap 120 to be attachable and detachable by a lateral rotation.

As shown in FIGS. 4 and 5, the top cap 120 according to the present embodiment may be configured to include a ceiling portion 123, a first downward extending portion 124, a fastening groove 125 and a second downward extending portion 126 having a specific structure.

Specifically, the ceiling portion 123 of the top cap 120 has a plate-like doughnut structure having the same outer diameter as the side wall portion 113 of the main body portion 110 in a plan view. The first downward extending portion 124 is integrated with the outer peripheral surface of the ceiling portion 123 and extends downward by a predetermined length to cover a part of the upper portion of the side wall portion 113. A plurality of fastening grooves 125 are formed on the inner peripheral surface of the first downward extending portion 124 at a predetermined angle, and are combined with the fastening protrusion 114 of the main body portion 110 to be attachable and detachable by a lateral rotation. In addition, the second downward extending portion 126 is configured to be continuously formed along the inner peripheral surface of the central through hole of the ceiling portion 123, and extends downward by a predetermined length to wrap a part of the upper portion of the filter portion 130.

In this case, according to the present embodiment, the main body portion 110 including the bottom portion 112, the side wall portion 113 and the fastening protrusion 114 of a particular structure is provided, and the top cap 120 including the ceiling portion 123, the first downward extending portion 124, the fastening groove 125 and the second downward extending 126 of a particular structure is provided. The doughnut-shaped filter portion 130 can be stably mounted inside. At the same time, it is possible to provide a filter equipment in which the top cap 120 and the main body portion 110 can be easily separated and the filter portion 130 mounted inside can be easily replaced with a new filter portion 130 after being detached.

Meanwhile, a sealing contact portion 122 may be further installed on the upper surface of the ceiling portion 123 of the top cap 120. At this time, the sealing contact portion 122 has a structure that makes surface contact with the lower surface of the air vent, and is preferably made of a sealing material that comes into close contact with the lower surface of the air vent.

Also, as shown in FIGS. 2 and 4, the magnetic member 121 according to the present embodiment may be a plurality of permanent magnets that are spaced apart from each other by a predetermined angle on the basis of the center of the top cap 120 in a plan view. At this time, the magnetic member 121 may have a structure that is detachably bolted to the upper surface of the top cap 120.

Figure 8:
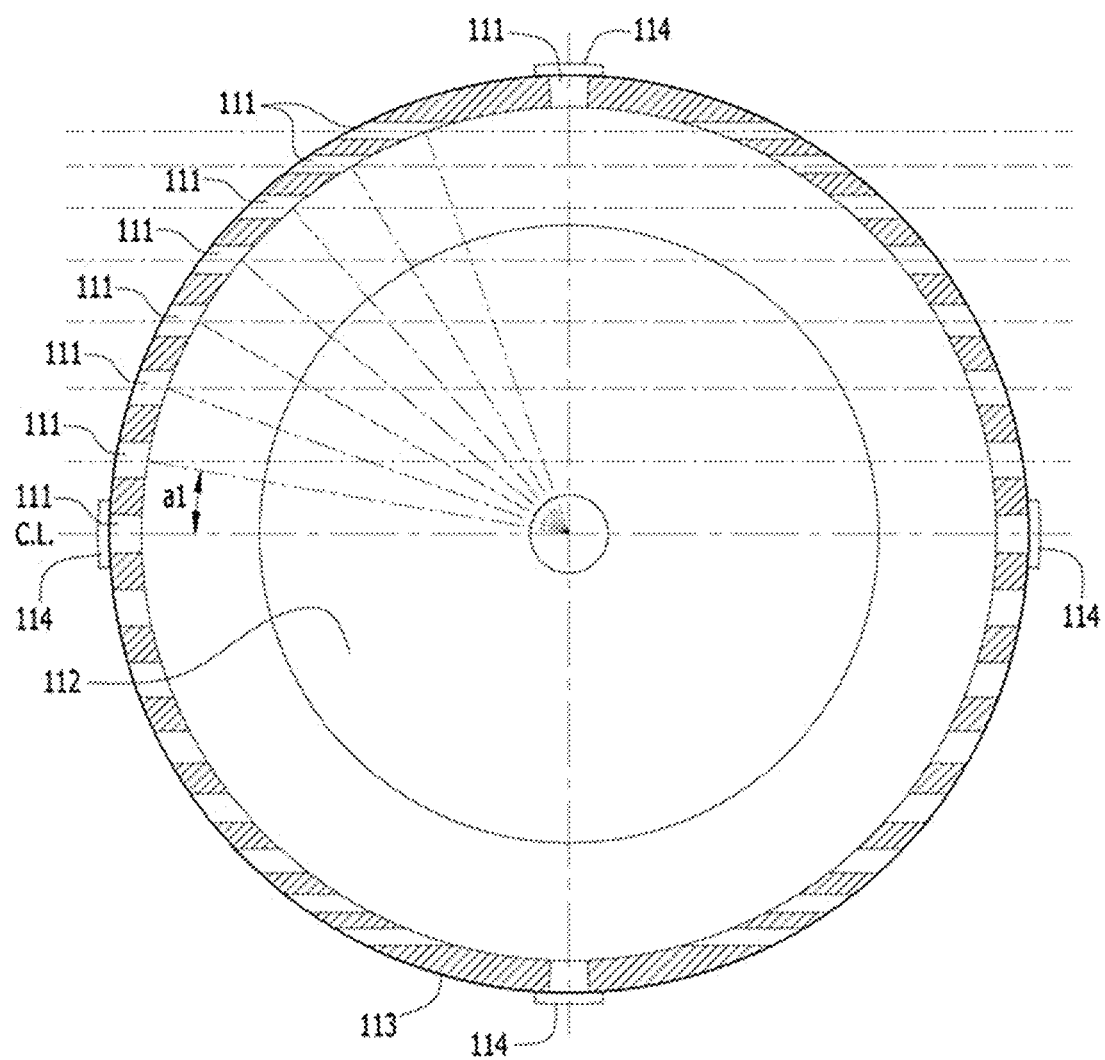
FIG. 8 is a schematic plan view showing a formation structure of a plurality of air inlets formed in the main body portion shown in FIG. 7.

FIG. 8 shows a schematic plan view showing the formation structure of a plurality of air inlets formed in the main body portion shown in FIG. 7.

Referring to FIGS. 6 to 8, a plurality of air inlets 111 according to the present embodiment are preferably formed at a predetermined angle on the basis of the center of the main body portion 110 in a plan view. Specifically, as shown in FIG. 8, the air inlet 111 is preferably formed to have an air flow path formed in a direction parallel to an arbitrary straight line passing through the center of the main body portion 110 in a plan view.

In this case, according to the present embodiment, since a large number of air inlets 111 having air flow paths formed in a specific direction are formed on the side surface of the main body portion 110, the flow direction of the air flowing in to the air inlets 111 of the main body portion 110 can be set in a specific direction depending on the intention of an installer. Accordingly, the main body portion 110 can be installed in an optimized direction in consideration of the flow direction of the indoor air and flow depending on the installation environment and intention. As a result, it is possible to provide a filter equipment including a structure that can maximize the filtering effect.

Figure 9:
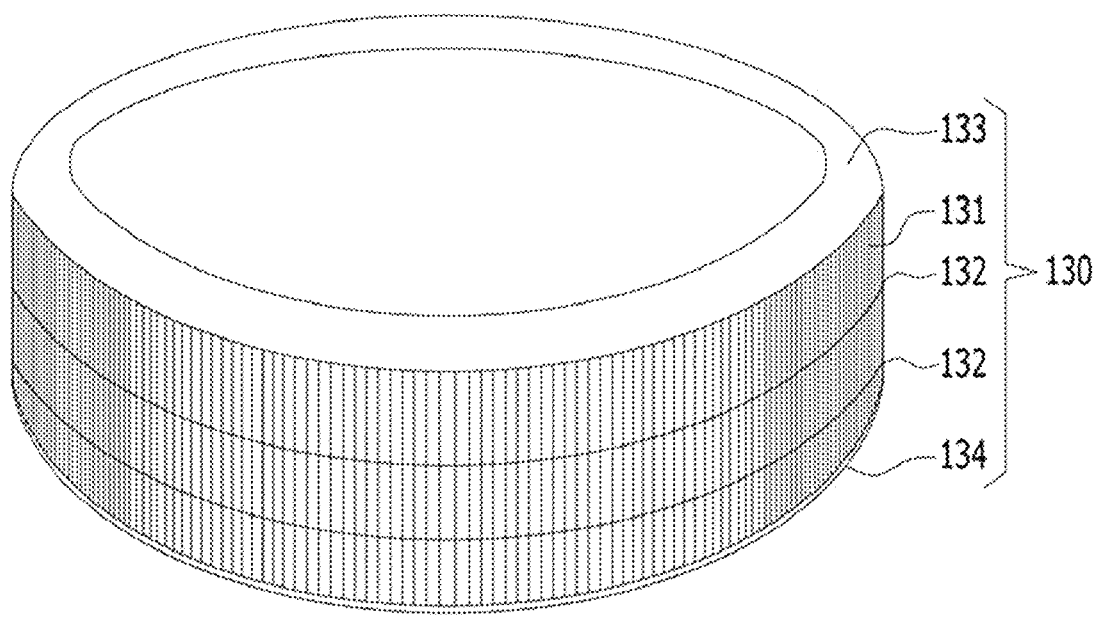
FIG. 9 is a photograph showing a filter portion of the filter equipment shown in FIG. 4.

FIG. 9 shows a photograph showing the filter portion of the filter equipment shown in FIG. 4.

Referring to FIG. 9 together with FIG. 7, the filter portion 130 according to the present embodiment may have a configuration including a filtering member 131, a state holding member 132, a filter upper end sealing portion 133 and a filter lower end sealing portion 134 of a specific structure.

Specifically, the filtering member 131 of the filter portion 130 is formed with a large number of pores for adsorbing particulate foreign matter floating in the air, and is formed by being continuously bent into a doughnut shape on the basis of the center in a plan view. At this time, the state holding member 132 is continuously mounted along the outer peripheral surface of the filtering member 131, and can maintain the continuous bending structure of the filtering member 131.

The filter upper end sealing portion 133 of the filter portion 130 according to this embodiment has a configuration attached to the upper surface of the filtering member 131, has a predetermined thickness, and has the same plate-like structure as the upper surface of the filtering member 131 in a plan view. At this time, the filter upper end sealing portion 133 is press-fitted to be in surface contact with the lower surface of the top cap 120, and can seal the upper surface of the filtering member 131 and the lower surface of the top cap 120.

Further, the filter lower end sealing portion 134 of the filter portion 130 according to the present embodiment has a configuration attached to the lower surface of the filtering member 131, has a predetermined thickness, and has the same plate-like structure as the lower surface of the filtering member 131 in a plan view. At this time, the filter lower end sealing portion 134 is press-fitted to be in surface contact with the upper surface of the main body portion 110, and can seal the lower surface of the filtering member 131 and the upper surface of the main body portion 110.

In this case, according to the present embodiment, the ceiling contact portion 122 and the magnetic member 121 having a specific structure are mounted on the upper surface of the ceiling portion 123 of the top cap 120, and the filter upper end sealing portion 133 and the filter lower end sealing portion 134 are mounted on the upper and lower surfaces of the filter portion 130, respectively. Accordingly, it is possible to provide a filter equipment which can be easily attached and installed magnetically to the lower surface of the air vent, can be in sealing contact with the lower surface of the air vent at the same time to prevent air from leaking through a gap formed between the upper surface of the top cap 120 and the lower surface of the air vent, thereby maximizing the filtering effect.

Figure 10:
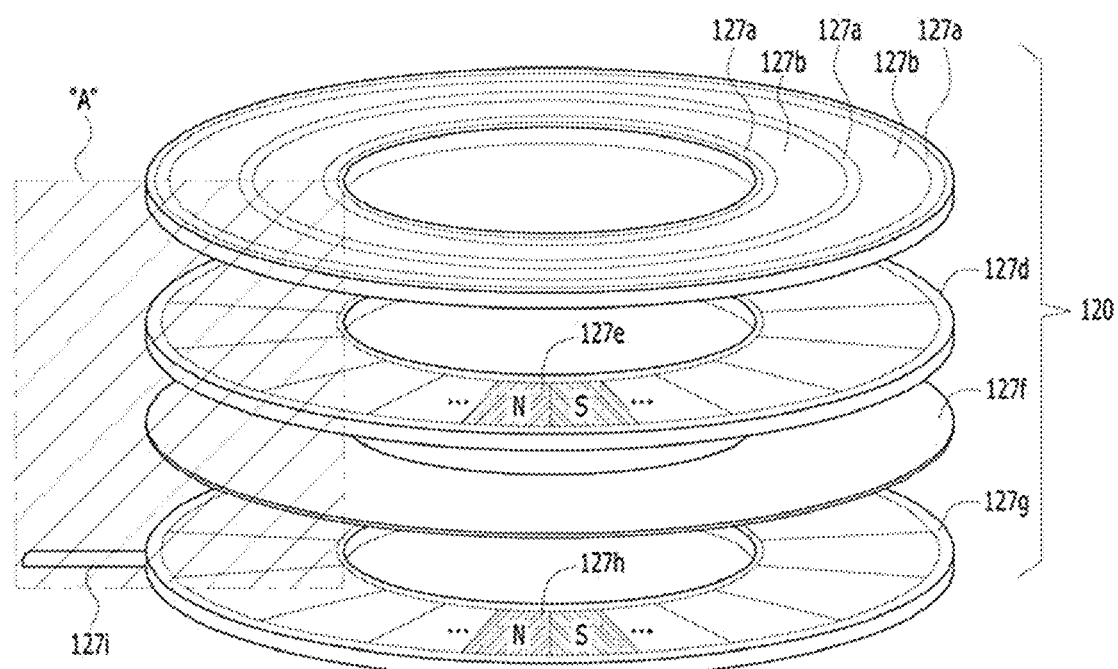
FIG. 10 is an exploded view showing a stacking structure of the top cap according to another embodiment of the present invention.
Figure 11:
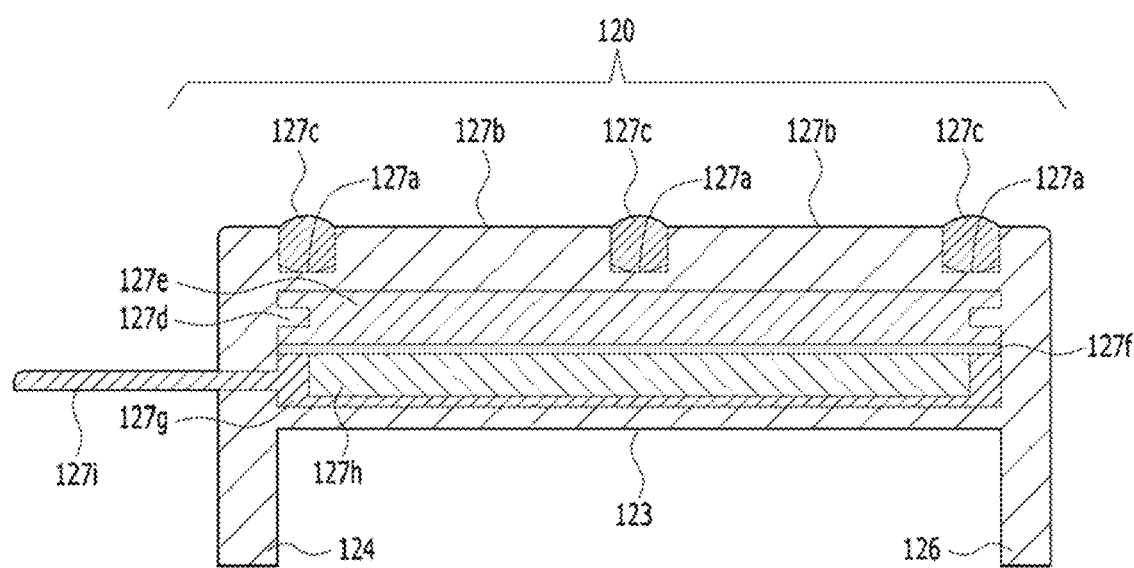
FIG. 11 is a cross-sectional view of part A of the top cap shown in FIG. 10.
Figure 12:
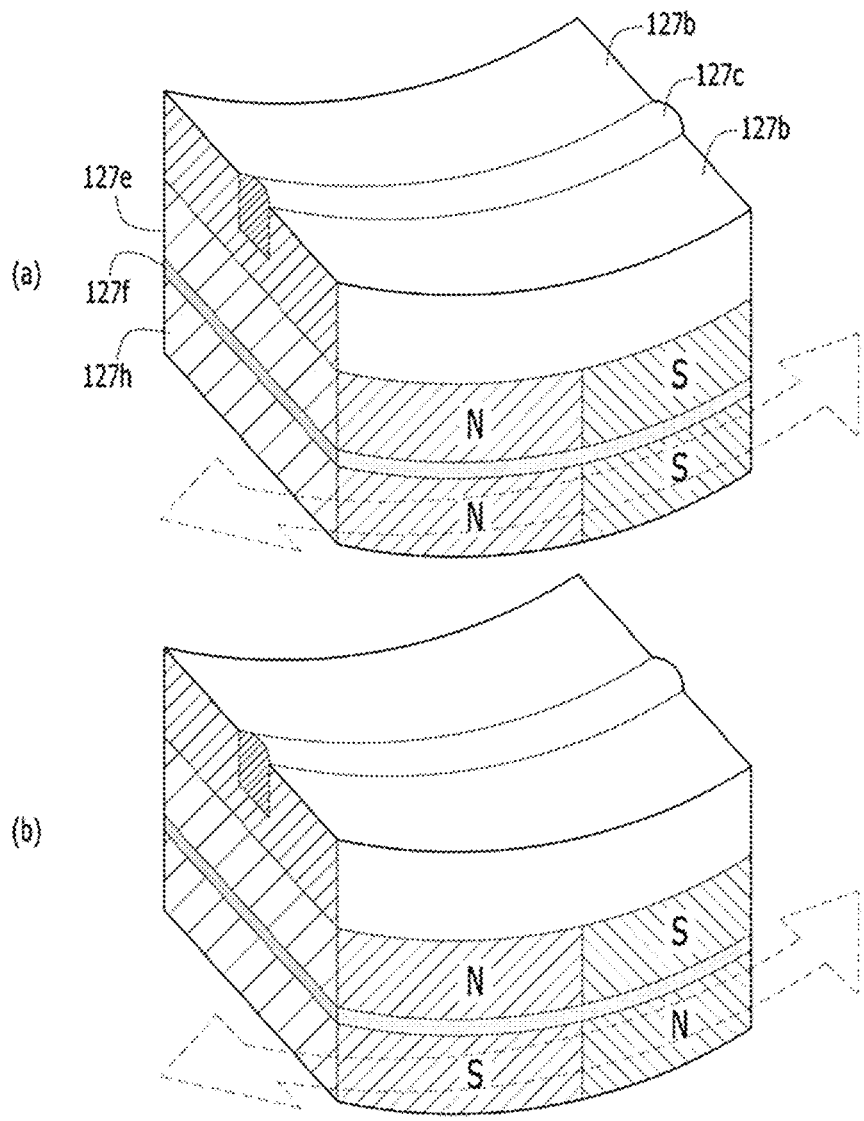
FIG. 12 is a partial schematic diagram showing an aspect in which magnetism is generated or extinguished by rotating a magnetic variable portion by a predetermined angle using a handle portion of the top cap shown in FIG. 11.

FIG. 10 shows an exploded view showing the stacking structure of the top cap according to still another embodiment of the present invention, and FIG. 11 shows a cutaway view of part A of the top cap shown in FIG. 10. Further, FIG. 12 is a partial schematic diagram showing an aspect in which magnetism is generated or extinguished by rotating the magnetic variable portion by a predetermined angle using the handle portion of the top cap shown in FIG. 11.

Referring to these drawings, the top cap 120 according to the present embodiment includes sealing grooves 127a, a sealing member 127c, a permanent magnet mounting portion 127d, a sliding thin plate portion 127f, a magnetic variable portion 127g, a handle portion 127i, and a rotation angle limiting structure (not shown).

Specifically, the sealing grooves 127a of the top cap 120 have a structure in which two or three grooves are concentrically formed on the basis of the center of the top cap 120 in a plan view, are spaced apart by a predetermined width, and are formed by being recessed by a predetermined depth. At this time, as shown in FIG. 11, a sealing member 127c which seals the upper surface of the top cap 120 and the lower surface of the air vent is mounted to the sealing groove 127a.

The permanent magnet mounting portion 127d according to the present embodiment is configured to be mounted to the lower surface of the top cap 120, and has a structure which mounts a plurality of plate-like first permanent magnets 127e to be spaced apart by a predetermined angle on the basis of the center of the top cap 120 in a plan view, and fixes N and S poles of the first permanent magnets 127e to be alternately arranged along the circular structure of the top cap 120 in a plan view. At this time, the sliding thin plate portion 127f is a thin plate structure stacked on the lower surface of the permanent magnet mounting portion 127d, and can guide the permanent magnet mounting portion 127d and the magnetic variable portion 127g to be slidable relative to each other and to change the positions.

In addition, the magnetic variable portion 127g according to the present embodiment is configured to be stacked and placed below the sliding thin plate portion 127f, and is mounted to be rotatable by a predetermined angle on the basis of to the center of the top cap 120 in a plan view. At this time, the magnetic variable portion 127g has a structure which mounts a large number of plate-like second permanent magnets 127h to be spaced apart by a predetermined angle on the basis of the center of the top cap 120 in a plan view, and fixes the N poles and S poles of the second permanent magnet to be alternately arranged along the circular structure of the top cap 120 in a plan view.

The handle portion 127i according to the present embodiment is configured to protrude laterally from the outer peripheral surface of the magnetic variable portion 127g by a predetermined length, and is gripped by a user's finger to rotate the magnetic variable portion 127g by a predetermined angle. At this time, a rotation angle limiting structure (not shown) can be mounted on one side of the top cap 120 to define a home position rotation angle range of the magnetic variable portion 127g.

The aforementioned structure is the same as the operating principle of a magnetic base and a mag-switch, the specific principle thereof is already known and omitted here.

In this case, according to the present embodiment, by providing the sealing groove 127a, the sealing member, the permanent magnet mounting portion 127d, the sliding thin plate portion 127f, the magnetic variable portion 127g, the handle portion 127i, and the rotation angle limiting structure of the specific structure, the filter equipment can be easily and stably attached to or detached from the lower surface of the air vent.

The foregoing detailed description of the invention has therefore only described specific embodiments. However, it should be understood that the invention is not intended to be limited to the particular forms referred to in this detailed description, rather, the invention should be understood to include all modifications, equivalents and alternatives falling within the spirit and scope of the invention as defined by the appended claims.

That is, the present invention is not limited to the particular embodiments and descriptions set forth above, and anyone who has ordinary skill in the art to which this invention pertains can make various modifications without departing from the scope of the invention as claimed, and such variations are within the protection scope of the present invention.

DESCRIPTION OF SYMBOLS

- 10: Air vent
- 20: Ceiling
- 100: Filter equipment
- 110: Main body portion
- 111: Air inlet
- 112: Bottom portion
- 113: Side wall portion
- 114: Fastening protrusion
- 120: Top cap
- 121: Magnetic material
- 122: Sealing contact portion
- 123: Ceiling portion
- 124: First downward extending portion
- 125: Fastening groove
- 126: Second downward extending portion
- 127a: Ceiling groove
- 127b: Contact surface
- 127c: Sealing member
- 127d: Permanent magnet mounting portion
- 127e: First permanent magnet
- 127f: Sliding thin plate part portion
- 127g: Magnetic variable portion
- 127h: Second permanent magnet
- 127i: Handle portion
- 130: Filter portion
- 131: Filtering member
- 132: State holding member
- 133: Filter upper end sealing portion
- 134: Filter lower end sealing portion
- 140: Safety wire

What is claimed is:

1. A filter equipment, comprising:
a main body portion (110) which has a hollow columnar structure with an open upper portion and a closed lower portion, and has a plurality of air inlets (111) formed on a side surface to be spaced apart at regular intervals;
a top cap (120) which is detachably attached to an upper opening surface of the main body portion (110), and has a doughnut structure having a width corresponding to that of the filter portion (130) in a plan view, a magnetic member (121) attached to a lower surface of an air vent by a magnetically detachable structure being mounted on an upper surface of the top cap;
a filter portion (130) which has a hollow columnar structure corresponding to an inner peripheral surface of a main body portion (110), has a doughnut structure having a width corresponding to the lower surface of the top cap (120), has a structure that is in close contact with the lower surface of the top cap (120), purifies the air drawn in from the air inlets (111) of the main body portion (110) and then makes the purified air flow through a central opening portion of the top cap (120) to the air vent; and
a safety wire (140) which is mounted inside the main body portion (110) and extends by a predetermined length to be combined with one side of the top cap (120),
wherein the filter portion (130) comprises:
a filtering member (131) which is formed with a large number of pores for adsorbing particulate foreign matter floating in the air, and is formed by being continuously bent into a doughnut shape on the basis of the center;
a state holding member (132) which is continuously mounted along an outer peripheral surface of the filtering member (131), and maintains the continuous bending structure of the filtering member (131);
a filter upper end sealing portion (133) which is mounted on the upper surface of the filtering member (131), has a predetermined thickness, has the same plate-like structure as the upper surface of the filtering member (131) in a plan view, and is press-fitted to be in surface contact with the lower surface of the top cap (120) to seal the upper surface of the filtering member (131) and the lower surface of the top cap (120); and
a filter lower end sealing portion (134) which is mounted on the lower surface of the filtering member (131), has a predetermined thickness, has the same plate-like structure as the lower surface of the filtering member (131) in a plan view, and is press-fitted to be in surface contact with the upper surface of the main body portion (110) to seal the lower surface of the filtering member (131) and the upper surface of the main body portion (110),
wherein the air inlets (111) are formed to be spaced apart by a predetermined angle on the basis of the center of the main body portion (110) in a plan view, and the air inlets (111) are formed to have an air flow path formed in a direction parallel to an arbitrary straight line passing through the center of the main body portion (110) in a plan view.

2. The filter equipment according to claim 1, wherein the main body portion (110) includes a bottom portion (112) which has a circular structure in a plan view, extends upward along an outer peripheral surface by a predetermined height and is integrally connected to a side wall portion (113);

the side wall portion (113) which has a structure integrated with the outer peripheral surface of the bottom portion (112) and extends by a predetermined height to form an internal space of the main body portion (110); and a plurality of fastening protrusions (114) which are formed on an outer peripheral surface of an upper portion of the side wall (113) to be spaced apart at a predetermined angle, and are combined with the fastening groove (125) of the top cap (120) to be attachable and detachable by a lateral rotation, wherein the top cap (120) includes a ceiling portion (123) of a plate-like doughnut structure which has the same outer diameter as the side wall portion (113) of the main body portion (110) in a plan view;

a first downward extending portion (124) which is integrated with an outer peripheral surface of the ceiling portion (123) and extends downward by a predetermined length to cover a part of the upper portion of the side wall portion (113);

a plurality of fastening grooves (125) which are formed on an inner peripheral surface of the first downward extending portion (124) to be spaced apart at a predetermined angle, and are combined with the fastening protrusion (114) of the main body portion (110) to be attachable and detachable by a lateral rotation;

a second downward extending portion (126) which is continuously formed along an inner peripheral surface of a central through hole of the ceiling portion (123), and extends downward by a predetermined length to wrap a part of the upper portion of the filter portion (130); and a sealing contact portion (122) which is mounted on the upper surface of the ceiling portion (123), has a structure that makes surface contact with the lower surface of the air vent, and is formed of a sealing material that comes into close contact with the lower surface of the air vent.

3. The filter equipment according to claim 1, wherein the top cap (120) includes sealing grooves (127*a*) which are concentrically formed on the basis of the center of the top cap (120) in a plan view, are spaced apart by a predetermined width, and are formed by two or three to be recessed by a predetermined depth;

a sealing member (127*c*) which is mounted on the sealing groove (127*a*) and seals the upper surface of the top cap (120) and the lower surface of the air vent;

a permanent magnet mounting portion (127*d*) which is mounted on the lower surface of the top cap (120), mounts a plurality of plate-like first permanent magnets (127*e*) to be spaced apart by a predetermined angle on the basis of the center of the top cap (120) in a plan view, and fixes N and S poles of the first permanent magnets (127*e*) to be alternately arranged along the circular structure of the top cap (120) in a plan view;

a sliding thin plate portion (127*f*) which has a thin plate structure stacked on a lower surface of the permanent magnet mounting portion (127*d*), and guides the permanent magnet mounting portion (127*d*) and the magnetic variable portion (127*g*) to be slidable relative to each other and to change the positions;

a magnetic variable portion (127*g*) which is stacked and placed below the sliding thin plate portion (127*f*), is mounted to be rotatable by a predetermined angle on the basis of to the center of the top cap (120) in a plan view, mounts a large number of plate-like second permanent magnets (127*h*) to be spaced apart by a predetermined angle on the basis of the center of the top cap (120) in a plan view, and fixes the N poles and S poles of the second permanent magnet to be alternately arranged along the circular structure of the top cap (120) in a plan view;

a handle portion (127*i*) which is formed to protrude laterally from an outer peripheral surface of the magnetic variable portion (127*g*) by a predetermined length, and is gripped by a user's finger to rotate the magnetic variable portion (127*g*) by a predetermined angle; and a rotation angle limiting structure which is mounted on one side of the top cap (120) to define a home position rotation angle range of the magnetic variable portion (127*g*).

\* \* \* \* \*